United States Patent
Hwang et al.

(10) Patent No.: US 7,656,764 B2
(45) Date of Patent: Feb. 2, 2010

(54) WRITE ONCE DISC, DISC DRIVE THEREFOR, AND METHOD OF MANAGING DISC DEFECT CONSIDERING COMPATIBILITY WITH REWRITABLE DISC DRIVE

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 11/941,145

(22) Filed: Nov. 16, 2007

(65) Prior Publication Data

US 2008/0068954 A1  Mar. 20, 2008

Related U.S. Application Data

(63) Continuation of application No. 10/797,105, filed on Mar. 11, 2004, now Pat. No. 7,327,655.

(30) Foreign Application Priority Data

Apr. 14, 2003  (KR)  ................ 2003-23518

(51) Int. Cl.
*G11B 7/007* (2006.01)

(52) U.S. Cl. ................ 369/53.17; 369/47.14

(58) Field of Classification Search .............. 369/30.21, 369/30.24, 30.36, 47.14, 53.17, 53.12, 53.15
See application file for complete search history.

(56) References Cited

U.S. PATENT DOCUMENTS

| 5,111,444 A | * | 5/1992 | Fukushima et al. | ...... 369/53.17 |
| 5,237,553 A | * | 8/1993 | Fukushima et al. | ...... 369/53.17 |

(Continued)

FOREIGN PATENT DOCUMENTS

JP  2002-288938  10/2002

OTHER PUBLICATIONS

U.S. Appl. No. 10/797,105, filed Mar. 11, 2004, Sung-hee Hwang et al.

(Continued)

*Primary Examiner*—Wayne R Young
*Assistant Examiner*—Thomas D Alunkal
(74) *Attorney, Agent, or Firm*—Stein McEwen, LLP

(57) ABSTRACT

A write once disc, a disc drive therefor, and a method of managing disc defects on the write once disc using the disc drive in consideration of the compatibility of the write once disc with a rewritable disc drive, the write once disc includes a single record layer disc in which a lead-in area, a data area, and a lead-out area are sequentially formed and a first spare area and a second spare area are sequentially formed in the data area. The write once disc includes a defect management area (DMA) formed in at least one of the lead-in area and the lead-out area; a first temporary defect management area (TDMA) formed in at least one of the lead-in area and the lead-out area; and a second TDMA formed between the first spare area and a user data area or between the user data area and the second spare area.

7 Claims, 13 Drawing Sheets

U.S. PATENT DOCUMENTS

| | | | |
|---|---|---|---|
| 5,715,221 A * | 2/1998 | Ito et al. | 369/47.14 |
| 5,841,748 A * | 11/1998 | Yamamuro | 369/47.14 |
| 6,160,778 A * | 12/2000 | Ito et al. | 369/53.15 |
| 6,405,332 B1 * | 6/2002 | Bando et al. | 714/723 |
| 6,469,978 B1 | 10/2002 | Ohata et al. | |
| 6,564,345 B1 * | 5/2003 | Kim et al. | 714/723 |
| 6,606,285 B1 * | 8/2003 | Ijtsma et al. | 369/47.1 |
| 7,000,152 B1 | 2/2006 | Lin | |
| 7,002,882 B2 | 2/2006 | Takahashi | |
| 7,188,271 B2 | 3/2007 | Park et al. | |
| 2002/0136537 A1 | 9/2002 | Takahashi | |
| 2002/0159382 A1 * | 10/2002 | Ohata et al. | 369/275.3 |
| 2003/0137909 A1 * | 7/2003 | Ito et al. | 369/47.14 |

OTHER PUBLICATIONS

Office Action issued on Aug. 25, 2009, in related Korean Patent Application No. 10-2003-0023518.

* cited by examiner (a)    (b)

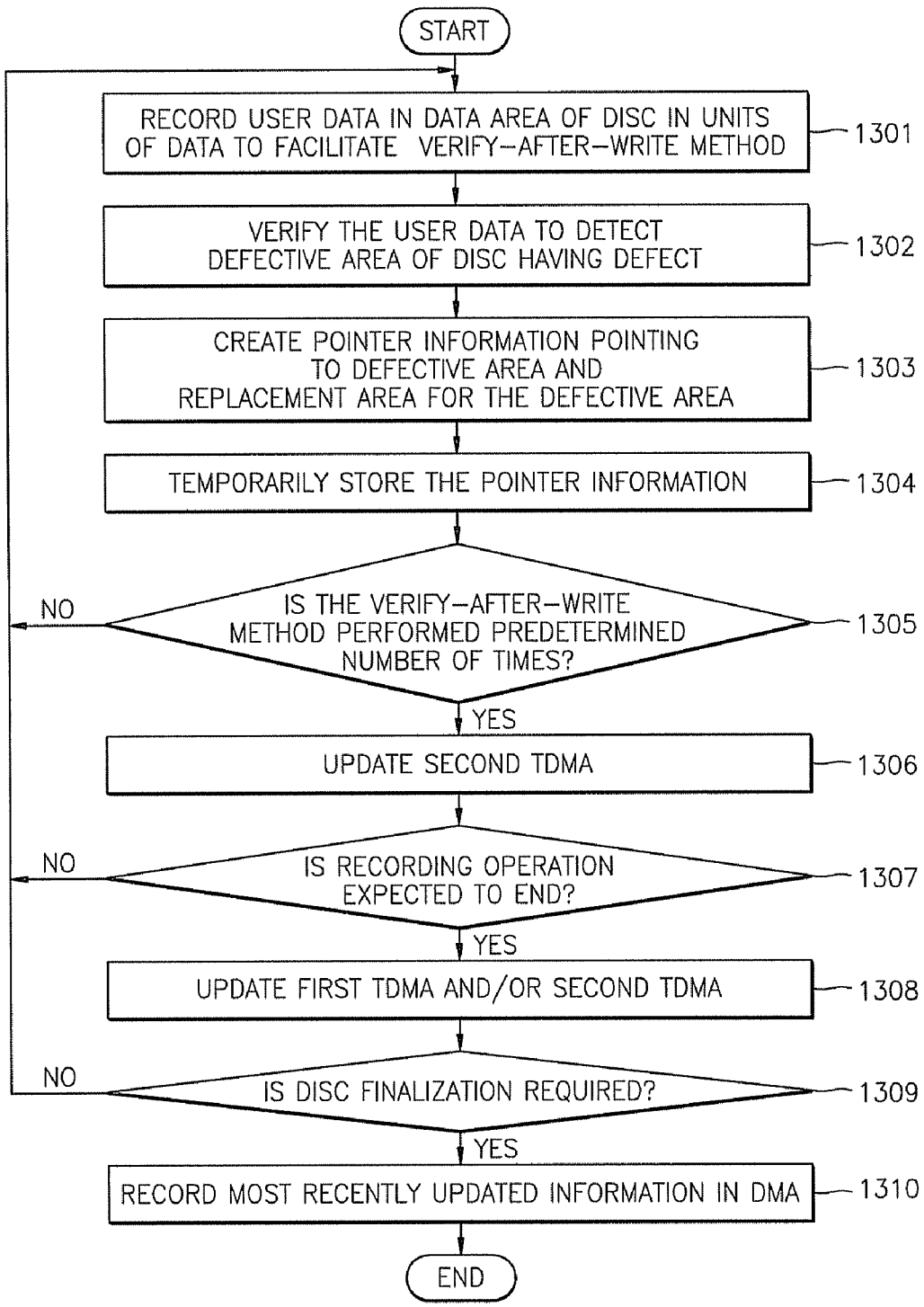

WRITE ONCE DISC, DISC DRIVE THEREFOR, AND METHOD OF MANAGING DISC DEFECT CONSIDERING COMPATIBILITY WITH REWRITABLE DISC DRIVE

CROSS-REFERENCE TO RELATED APPLICATIONS

This application is a continuation of U.S. patent application Ser. No. 10/797,105 filed Mar. 11, 2004, now U.S. Pat. No. 7,327,655 and also claims the priority of Korean Patent Application No. 2003-23518 filed on Apr. 14, 2003, in the Korean Intellectual Property Office, the disclosures of which are incorporated herein by reference.

BACKGROUND OF THE INVENTION

1. Field of the Invention

The present invention relates to disc defect management for a write once disc, and more particularly, to a write once disc, a disc drive therefor, and a method of performing disc defect management in consideration of the compatibility with a rewritable disc drive.

2. Description of the Related Art

Disc defect management is the process of rewriting data stored in a user data area of a disc in which a defect exists to a new portion of the disc's data area, thereby compensating for data loss caused by the defect. In general, disc defect management is performed using linear replacement or slipping replacement methods. In the linear replacement method, a user data area in which a defect exists is replaced with a spare data area having no defects. In the slipping replacement method, a user data area with the defect is slipped and the next user data area having no defects is used.

Both linear replacement and slipping replacement methods are, however, applicable only to discs such as a DVD-RAM/RW, on which data can be repeatedly recorded and recording can be performed using a random access method. In other words, the conventional linear replacement and slipping replacement methods cannot be applied to write once discs on which recording is allowed only once. In general, the presence of defects in a disc is detected by recording data on the disc and confirming whether or not data has been recorded correctly on the disc. However, once the data is recorded on a write once disc, it is impossible to overwrite new data and manage defects therein.

After the development of a CD-R and a DVD-R, a high-density write once disc with a recording capacity of several dozen GBs has been introduced. This type of disc can be used as a backup disc since it is not expensive and allows random access that enables fast reading operations. However, disc defect management is not available for write once discs. Therefore, a backup operation may be discontinued when a defective area, i.e., an area where a defect exists, is detected during the backup operation. In general, the backup operation is performed when a system is not frequently used, e.g., at night when a system manager does not operate the system. In this case, it is more likely that the backup operation will be discontinued because a defective area of a write once disc is detected.

Meanwhile, when additional data will not be recorded on a recordable disc, i.e., when only data reproduction will be allowed, write protect information is recorded on the disc to prevent the data recorded on the disc from being mistakenly erased. However, once the write protect information is recorded, recording is not further allowed, and, thus, possible disc defects cannot be managed. Because recording is not allowed in a data area of the disc after recording of the write protect information, disc defect management cannot be performed.

Conventionally, location information regarding disc areas for disc defect management has been specified in the specifications and a disc drive designer designs a disc drive based on the specifications. Accordingly, if a new disc area is further added to the existing disc areas, a conventional disc drive cannot recognize the presence of the new disc area and satisfactorily perform disc defect management.

SUMMARY OF THE INVENTION

The present invention provides a write once disc, and a disc defect management method and disc drive capable of managing disc defects even when a defect is detected during a recording operation, thereby allowing the recording operation to be performed without interruption.

The present invention also provides a write once disc with a temporary defect management area(s) and a method and apparatus managing disc defects in consideration of the compatibility with a rewritable disc drive, According to an aspect of the present invention, there is provided a method of managing disc defects occurring on a write once disc that is a single record layer disc in which a lead-in area, a data area, and a lead-out area are sequentially formed and a first spare area and a second spare area are formed at both ends of the data area, the method including allocating a first temporary defect management area (TDMA) to at least one of the lead-in area and the lead-out area; allocating a second TDMA between the first spare area and a user data area or between the user data area and the second spare area; and performing disc defect management using the first and second TDMAs.

According to another aspect of the present invention, there is provided a method of managing disc defects occurring on a write once disc that is a double record layer disc including a first record layer in which a lead-in area, a data area, and an outer area are formed along a recording path and a first spare area and a second spare area are formed at the both ends of the data area; and a second record layer in which an outer area, a data area, and a lead-out area are formed along a recording path and a third spare area and a fourth spare area are formed at the both ends of the data area, the method including allocating a first temporary defect management area (TDMA) to at least one of the lead-in area, the lead-out area, and the outer area; allocating a second TDMA between the first spare area and a user data area and/or between the fourth spare area and the user data area; and performing disc defect management using the first and second TDMAs.

According to yet another aspect of the present invention, there is provided a method of managing disc defects occurring on a write once disc, the method including updating a second TDMA of a data area of the write once disc whenever data is recorded in the data area in a predetermined recording period; updating a first TDMA formed in at least one of a lead-in area, a lead-out area, and an outer area of the write once disc whenever data is recorded in a data area of the write once disc in another predetermined recording period; and recording temporary management information, which is most recently updated and recorded in the first or second TDMA, in a defect management area (DMA) formed in at least one of the lead-in area, the lead-out area, and the outer area.

According to still another aspect of the present invention, there is provided a disc drive including a pickup that records data on or reads data from a write once disc; and a controller that controls the pickup to allocate a first TDMA to at least one of a lead-in area and a lead-out area of the write once disc, allocate a second TDMA between a first spare area and a user data area or between the user data area and a second spare area, and perform disc defect management on the write once disc using the allocated first and second TDMAs. The write once disc is a single record layer disc in which the lead-in area, a data area, and the lead-out area are sequentially formed and the first and second spare areas are formed at both ends of the data area.

According to still another aspect of the present invention, there is provided a disc drive including a pickup that records data on or reads data from a write once disc; and a controller that controls the pickup to allocate a first TDMA to at least one of a lead-in area, a lead-out area, and an outer area of the write once disc, allocate a second TDMA between a first spare area and a user data area and/or between a fourth spare area and the user data area, and perform disc defect management on the write once disc using the allocated first and second TDMAs. The write once disc is a double record layer disc including a first record layer in which the lead-in area, a data area, and the outer area are formed along a recording path, and the first spare area and a second spare area are formed at both ends of the data area; and including a second record layer in which an outer area, a data area, and a lead-out area are formed along a recording path, and a third spare area and the fourth spare area are formed at both ends of the data area.

According to still another aspect of the present invention, there is provided a disc drive including a pickup that records data on or reads data from a write once disc; and a controller that controls the pickup to update a second TDMA formed in a user data area of the write once disc whenever data is recorded in the user data area in a predetermined recording period; update a first TDMA formed in at least one of a lead-in area, a lead-out area, and an outer area of the write once disc whenever data is recorded in the user data area in another predetermined recording period; and record temporary management information, which is recently updated and recorded in the first or second TDMA, in a DMA formed in at least one of the lead-in area, the lead-out area, and the outer area.

According to still another aspect of the present invention, there is provided a write once disc that is a single record layer disc in which a lead-in area, a data area, and a lead-out area are sequentially formed and a first spare area and a second spare area are sequentially formed in the data area, the write once disc comprising a DMA formed in at least one of the lead-in area and the lead-out area; a first TDMA formed in at least one of the lead-in area and the lead-out area; and a second TDMA formed between the first spare area and a user data area or between the user data area and the second spare area.

According to still another aspect of the present invention, there is provided a write once disc that is a double record layer disc including a first record layer in which a lead-in area, a data area, and an outer area are sequentially formed along a recording path and a first spare area and a second spare area are formed at both ends of the data area, and including a second record layer in which an outer area, a data area, and a lead-out area are sequentially formed along a recording path and a third spare area and a fourth spare area are formed at both ends of the data area, the write once disc comprising a DMA formed in at least one of the lead-in area, the lead-out area, and the outer area; a first TDMA formed in at least one of the lead-in area, the lead-out area, and the outer area; and a second TDMA formed between the first spare area and a user data area and/or between the fourth spare area and the user data area.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 13 is a flowchart illustrating a disc defect management method according to another embodiment of the present invention.

DETAILED DESCRIPTION OF THE EMBODIMENTS

Figure 1:
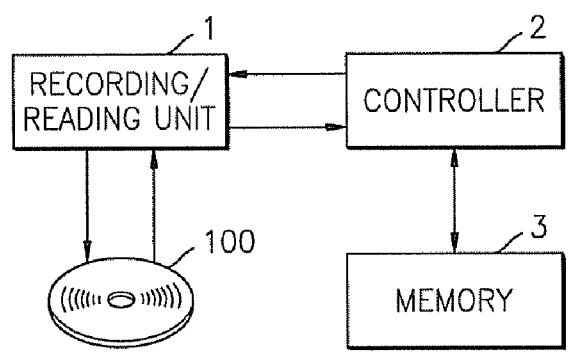
FIG. 1 is a block diagram of a recording and/or reproducing apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a recording and/or reproducing apparatus according to an embodiment of the present invention. Referring to FIG. 1, the recording and/or reproducing apparatus includes a recording/reading unit 1, a controller 2, and a memory 3. The recording/reading unit 1 records data on a disc 100, which is an information storage medium according to an embodiment of the present invention, and reads back the data from the disc 100 to verify the accuracy of the recorded data. The controller 2 performs disc defect management according to the present invention. More specifically, the controller 2 further allocates two temporary defect management areas (TDMAs) to the disc 100 according to a user input or in a predetermined manner, and performs disc defect management on the disc 100 using the two TDMAs.

In this embodiment, the controller 2 uses a verify-after-write method in which data is recorded on the disc 100 in predetermined units of data and the accuracy of the recorded data is verified to detect if an area of the disc 100 has a defect. In other words, the controller 2 records user data on the disc 100 in units of recording operations and verifies the recorded user data to detect an area of the disc 100 in which a defect exists. Thereafter, the controller 2 creates defect information which indicates the position of the area with the defect and stores the created defect information in the memory 3. When the stored defect information reaches a predetermined amount, the controller 2 records the stored defect information as temporary defect information in the two TDMAs of the disc 100. In this disclosure, information recorded in a TDMA will be referred to as temporary management information corresponding to management information, managing disc defects, which is recorded in a defect management area (DMA).

In this embodiment, whenever the verify-after-write method is completed at least once, the controller 2 reads the defect information from the memory 3, provides the defect information to the recording/reading unit 1, and controls the recording/reading unit 1 to record the defect information as temporary management information in the TDMAs. Further, when a user presses the eject button (not shown) of the recording apparatus in order to remove the disc 100 after the recording of data, the controller 2 expects the recording operation to be completed. Next, the controller 2 reads the defect information from the memory 3, provides the defect information to the recording/reading unit 1, and controls the recording/reading unit 1 to record the defect information in the TDMAs of the disc 100.

When the recording of data is completed, i.e., additional data will not be recorded on the disc 100 (the disc 100 needs to be finalized), the controller 2 controls the recording/reading unit 1 to rewrite the recorded temporary management information to the DMA of the disc 100.

In general, a size of a DMA allocated to a rewritable disc is not large. If a write once disc includes a DMA with the same size and position as that of the rewritable disc in consideration of only the compatibility with a rewritable disc drive, data may not be further recorded in the DMA before a data area of the write once disc is fully recorded. In this case, disc defect management cannot be further performed. For this reason, according to the present invention, the TDMAs are additionally formed in a write once disc and lastly recorded information is recorded in the DMA for disc finalization, thus enabling the rewritable disc drive to accurately perceive areas allocated to the write once disc. That is, a write once disc according to the present invention is compatible with the rewritable disc drive.

Figure 2:
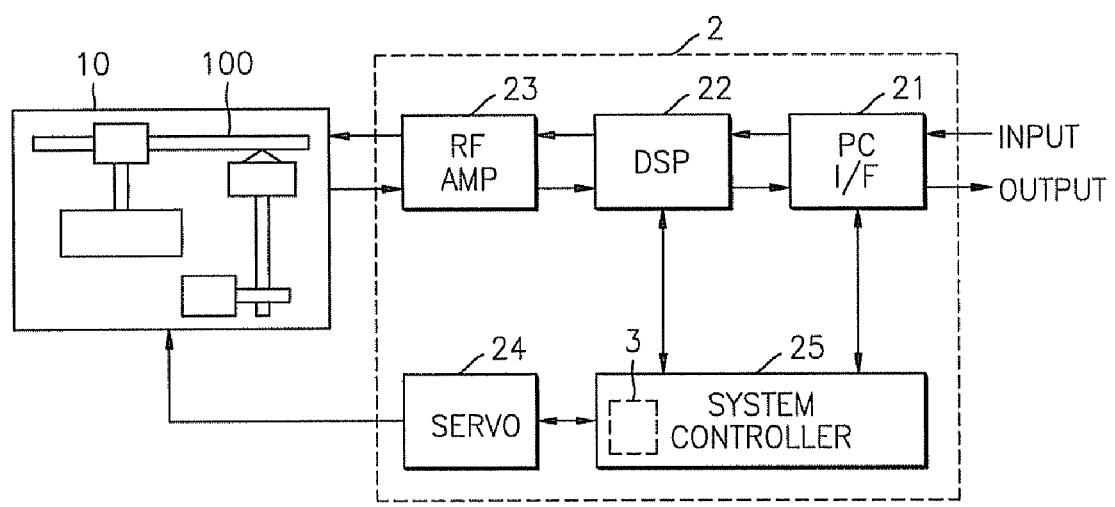
FIG. 2 is a block diagram of a disc drive that is another embodiment of the recording and/or reproducing apparatus of FIG. 1.

FIG. 2 is a block diagram of a disc drive that is an embodiment of the recording and/or reproducing apparatus of FIG. 1. The disc drive of FIG. 2 includes a pickup 10 acting as the recording/reading unit 1 of FIG. 1. A disc 100 is loaded onto the pickup 10. Also, the disc drive includes a PC interface (I/F) 21, a digital signal processor (DSP) 22, a radio-frequency (RF) amplifier 23, a servo 24, and a system controller 25 which correspond to the controller 2 of FIG. 1. The system controller 25 also acts as the memory 3 of FIG. 1.

During a write operation, the PC I/F 21 receives data to be recorded and a write command from a host (not shown). The system controller 25 performs disc initialization prior to data recording. The DSP 22 adds additional data such as parity into the data transmitted from the PC I/F 21, performs error correction coding (ECC) on the data, and modulates the ECC encoded data using a predetermined method. The RF amplifier 23 converts data output from the DSP 22 into an RF signal. The pickup 10 records the RF signal output from the RF amplifier 23 on the disc 100. The servo 24 receives a servo control command from the system controller 25 and performs a servo control on the pickup 10. Also, the system controller 25 instructs the recorded data to be read by the pickup 10 or predetermined information such as temporary management information to be recorded, so as to perform disc defect management according to the present invention.

During a read operation, the PC I/F 21 receives a read command from the host and the system controller 25 performs data reading disc initialization. The pickup 10 irradiates a laser beam onto the disc 100 and receives a laser beam reflected from the disc 100, converts the laser beam into an optical signal, and outputs the optical signal. The RF amplifier 23 converts the optical signal output from the pickup 10 into an RF signal, provides data obtained by modulating the RF signal to the DSP 22, and provides a servo control signal obtained from the RF signal to the servo 24. The DSP 22 demodulates the modulated data, performs ECC on the demodulated data, and outputs the error correction coded data. The servo 24 receives the servo control signal from the RF amplifier 23 and the servo control command from the system controller 25 and performs servo control on the pickup 10. The PC I/F 21 transmits the error correction coded data from the DSP 22 to the host. Also, during the read operation, the system controller 25 may instruct information for disc defect management to be read by the pickup 10, that is, the system controller manages the overall system during a read/write operation.

Figure 3A:
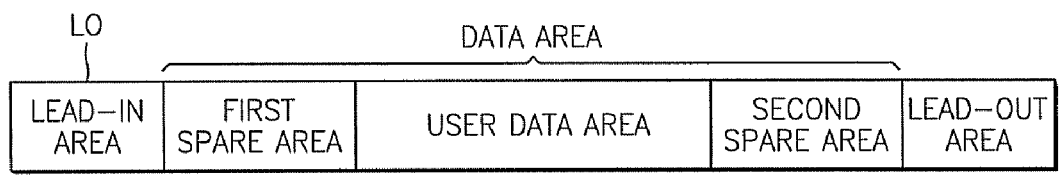
FIG. 3A illustrates a data structure of a disc with a single record layer, to which a temporary defect management area (TDMA) will be additionally allocated, according to an embodiment of the present invention.
Figure 3B:
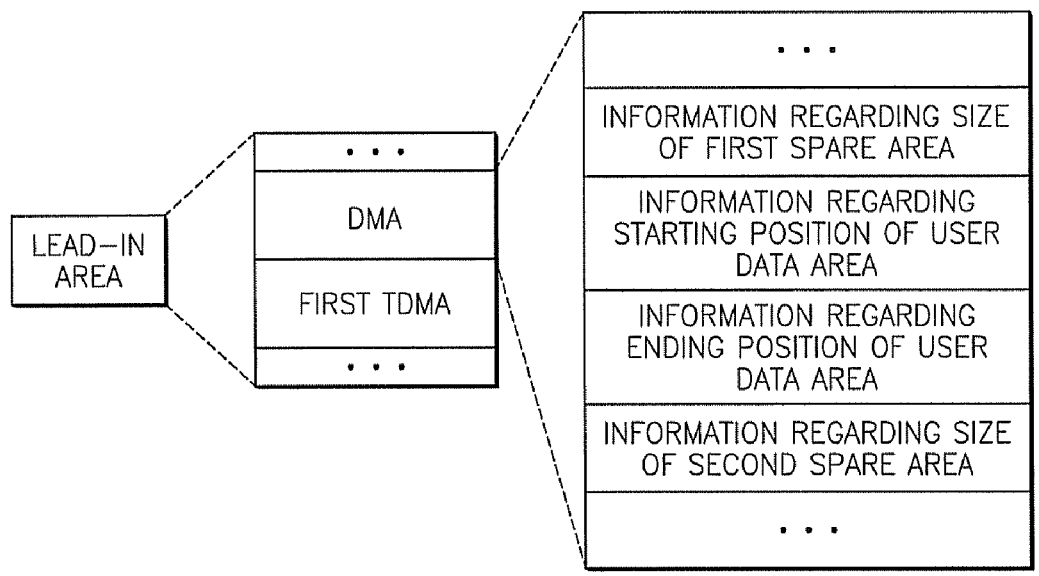
FIG. 3B illustrates a data structure of a lead-in area of the disc of FIG. 3A, according to an embodiment of the present invention.

FIG. 3A illustrates a data structure of the disc 100 of FIG. 1 having a single record layer L0 to which a temporary defect management area (TDMA) will be additionally allocated, according to an embodiment of the present invention. FIG. 3B illustrates a data structure of a lead-in area of the disc 100 of FIG. 3A, according to an embodiment of the present invention.

Referring to FIG. 3A, the disc 100 includes a lead-in area, a data area, and a lead-out area. The lead-in area and the lead-out area are located in an inner part and an outer part of the disc 100, respectively. The data area is present between the lead-in area and the lead-out area and is divided into a first spare area, a user data area, and a second spare area starting from the inner part of the disc 100.

The user data area is an area where user data is recorded. The first and second spare areas are replacement areas for a user data area having a defect, serving to compensate for loss in the recording area due to the defect. On the assumption that defects may occur within the disc 100, [it is preferable that] the spare area is about 5% of the entire data capacity of the disc 100, so that a greater amount of data can be recorded on the disc 100.

Referring to FIG. 3B, the lead-in area of FIG. 3A includes a defect management area (DMA) and a first temporary defect management area (TDMA). The first TDMA is located within a range that does not change the positions of the lead-in area and the lead-out area defined with respect to a write once disc or rewritable disc. Unlike a rewritable disc, a write once disc further requires a TDMA to perform disc defect management using the disc drive of FIG. 2. As previously mentioned, in contrast to the rewritable disc, once data is recorded on the write once disc, it is impossible to overwrite new data. Thus, the disc 100, which is the write once disc, requires a new area, such as the TDMA, for recording updated information. A size of the new area is spacious enough to allow update information to be recorded therein a plurality of number of times. Meanwhile, like the rewritable disc, the lead-in area of the write once disc includes a test area recording condition test and a drive information area recording information regarding a disc drive. The DMA and/or TDMA may be formed in the lead-out area.

Like the rewritable disc on which disc defect management can be performed, the DMA of the disc 100 includes information regarding a size of a first spare area, information regarding a starting position of a user data area, information regarding an ending position of the user data area, and information regarding a size of a second spare area. Accordingly, the disc drive of FIG. 2 reads this information to detect the starting and ending positions of the user data area and recognizes the first and second spare areas based on the starting and ending positions and the information regarding their sizes.

Figure 4A:
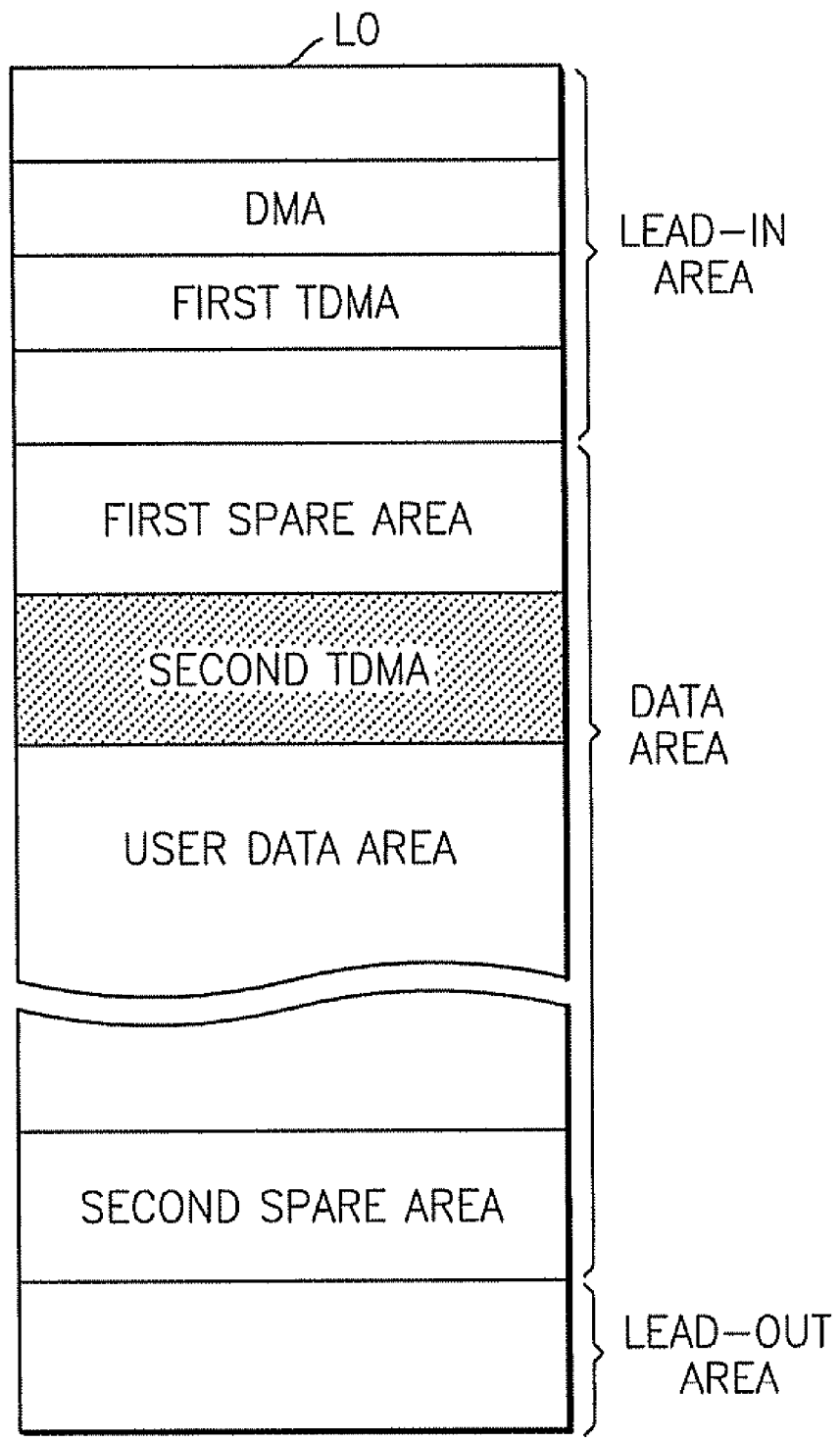
FIGS. 4A and 4B illustrate data structures of the disc of FIG. 3A further including an additional TDMA, according to embodiments of the present invention.
Figure 4B:
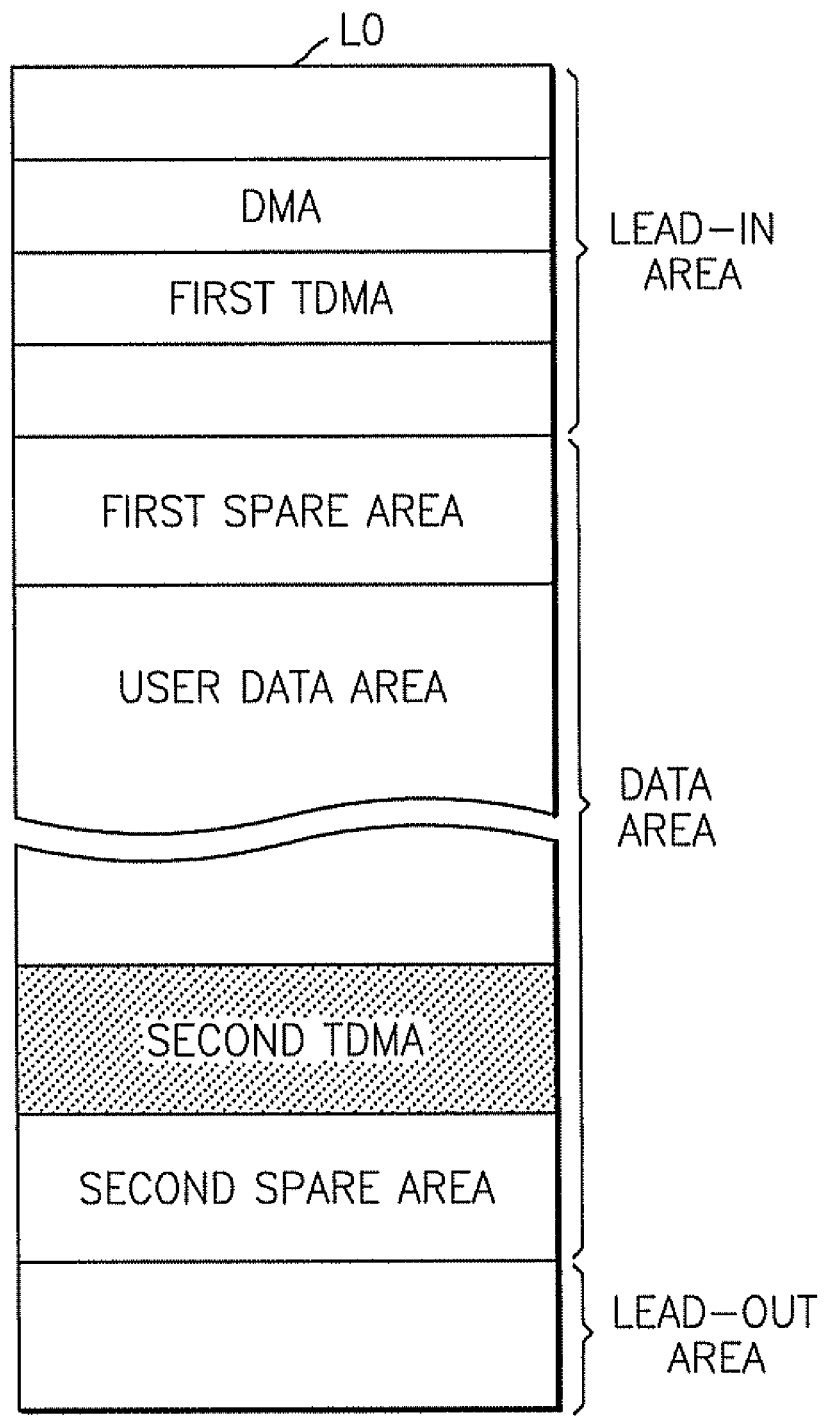

FIGS. 4A and 4B illustrate data structures of the disc of FIG. 3A further including a second TDMA, according to embodiments of the present invention.

Referring to FIG. 4A, the second TDMA is allocated between a first spare area and a user data area of the disc 100 at a beginning of a write/read operation, according to the user input. Starting and ending positions of the data area are set as shown with respect to FIG. 3B and maintained.

Temporary management information is recorded in a first TDMA and the second TDMA. The temporary management information includes temporary defect information and management information managing the temporary defect information. Further, in this embodiment, a space bit map is recorded in the first and second TDMAs.

The first TDMA is updated in recording operation units, and the second TDMA is updated whenever information is recorded in a predetermined number of cluster units or whenever the verify-after-write method is performed at least once. Thus, the second TDMA must be spacious because the second TDMA is updated more often than the first TDMA. For this reason, it is preferable that the first TDMA is formed in the lead-in area or the lead-out area and the second TDMA is allocated to the data area which has a larger storage area.

The second TDMA is not allocated when a user does not desire to perform disc defect management using the disc drive, or when the user does not want to allocate the second TDMA although he or she desires to perform disc defect management using the disc drive. In other words, the second TDMA is allocated to the data area at a beginning of the write/read operation only when the user desires disc defect management to be performed on the disc 100 using the disc drive and the second TDMA.

Referring to FIG. 4B, when the user desires to allocate a second TDMA, the second TDMA is allocated between a user data area and a second spare area of a data area of the disc 100 at a beginning of a write/read operation. Similarly, the second TDMA is not allocated when the user does not desire to perform disc defect management using the disc drive, or when the user does not want to allocate the second TDMA although the user desires to perform disc defect management using the disc drive. That is, the second TDMA is allocated to the data area at a beginning of the write/read operation only when the user desires disc defect management to be performed on the disc 100 using the disc drive and the second TDMA.

A data structure of each area of the disc 100 of FIG. 4B is the same as that of each area of the disc 100 of FIG. 4A. Therefore, a detailed description thereof will not be repeated here.

The second TDMA shown in FIG. 4A or 4B is helpful for the following reasons. The first TDMA is updated in recording operation units and the disc drive temporarily stores updated temporary management information during a recording operation. If a power failure occurs when the disc drive is in a stand by mode in another recording operation, the temporarily stored management information will be lost, causing a problem to occur when the disc 100 is used later. In contrast, the second TDMA is updated whenever the verify-after-write method is accomplished. Therefore, it is possible to prevent data loss, that is, disc damage, even when a power failure occurs during a recording operation of the disc drive. Next, the verify-after-write method is performed a predetermined number of times during a recording operation. The predetermined number of times is an integer. Thus, if the first TDMA is updated whenever the verify-after-write method is performed, the most recent information is recorded in both the first and second TDMAs after the recording operation is completed, thereby increasing the robustness of information. Accordingly, inclusion of the second TDMA on the disc 100 solves a problem caused by a power failure occurring in a write stand-by mode and increases the robustness of information.

Figure 5:
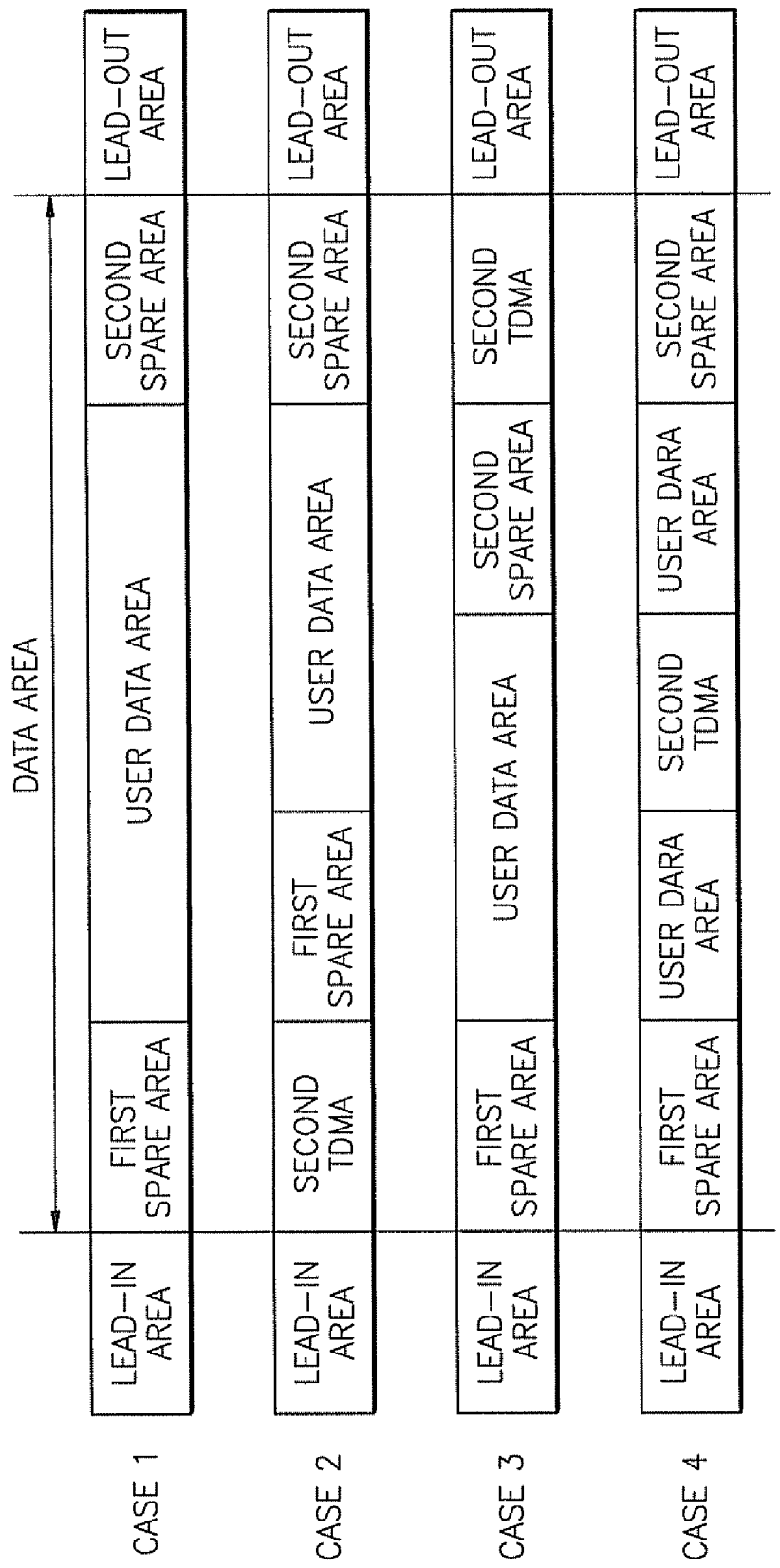
FIG. 5 illustrates data structures of a disc that are not compatible with a rewritable disc drive.

FIG. 5 illustrates data structures of a write once disc that are not compatible with a rewritable disc drive. Referring to FIG. 5, case 1 shows a data structure of a write once disc such as that shown in FIG. 3A. If the write once disc of case 1 is loaded into the rewritable disc drive, the rewritable disc drive recognizes first and second spare areas based on the information regarding starting and ending positions of a user data area as described with reference to FIG. 3, the information being recorded in a DMA. Also, because the position of each area shown in case 1 is equivalent to that of each area of FIG. 3A, the rewritable disc drive can appropriately perform a read command from a host (not shown) by reading replacements, for data stored in a portion of the user data area in which a defect exists, which are recorded in the first and second spare areas as a result of disc defect management. Further, the starting and ending positions of the user data area is specified in the DMA, and thus an improper area is prevented from being mistakenly recognized during the read operation.

However, if the second TDMA is allocated to a write once disc as shown in cases 2 through 4, that is, the second TDMA is allocated to a portion of a data area, other than those shown in FIGS. 4A and 4B, the rewritable disc drive may not reproduce information stored in the write once disc for the following reasons.

The rewritable disc drive recognizes the user data area and the first and second spare areas, based on the starting and ending positions of the data area defined in the specifications and the information recorded in the DMA of FIG. 3B.

More specifically, the rewritable disc drive recognizes a zone, which ranges from a start of the data area and has a size as defined in the information regarding a size of the first spare area, as the first spare area. Also, the rewritable disc drive recognizes a zone, which ranges from an end of the data area and has a size as defined in the information regarding a size of the second spare area, as the second spare area. Further, the rewritable disc drive recognizes a zone, which ranges from the starting position of the user data area to the ending position thereof, as the user data area.

Accordingly, when a write once disc with a data structure shown in cases 2 through 4 is loaded into the rewritable disc drive, the rewritable disc drive will mistakenly recognize the various areas. For instance, the rewritable disc drive cannot detect first and second spare areas from the write once disc shown in cases 2 and 3, and cannot detect a user data area from the write once disc shown in case 4. Accordingly, the second TDMA is required to be allocated as shown in FIG. 4A or 4B so that the rewritable disc drive can recognize each area of a write once disc.

Figure 6A:
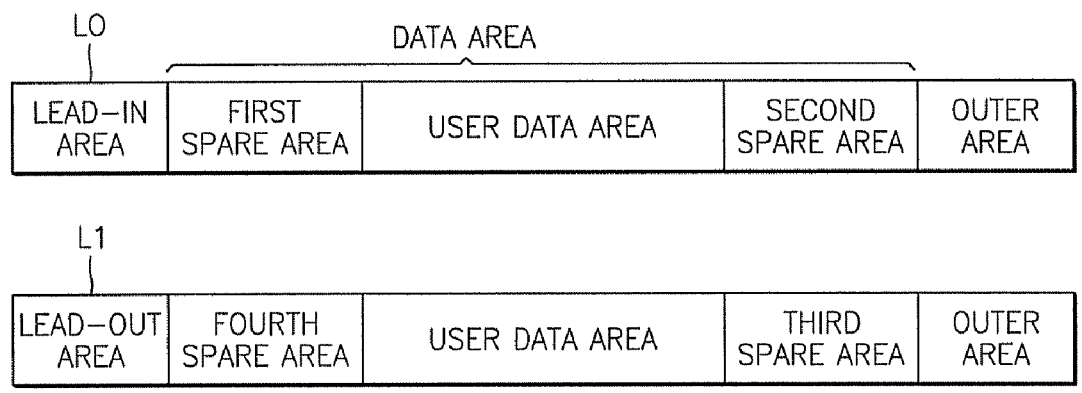
FIG. 6A illustrates a data structure of a disc with two record layers, to which a temporary defect management area (TDMA) will be additionally allocated, according to an embodiment of the present invention.
Figure 6B:
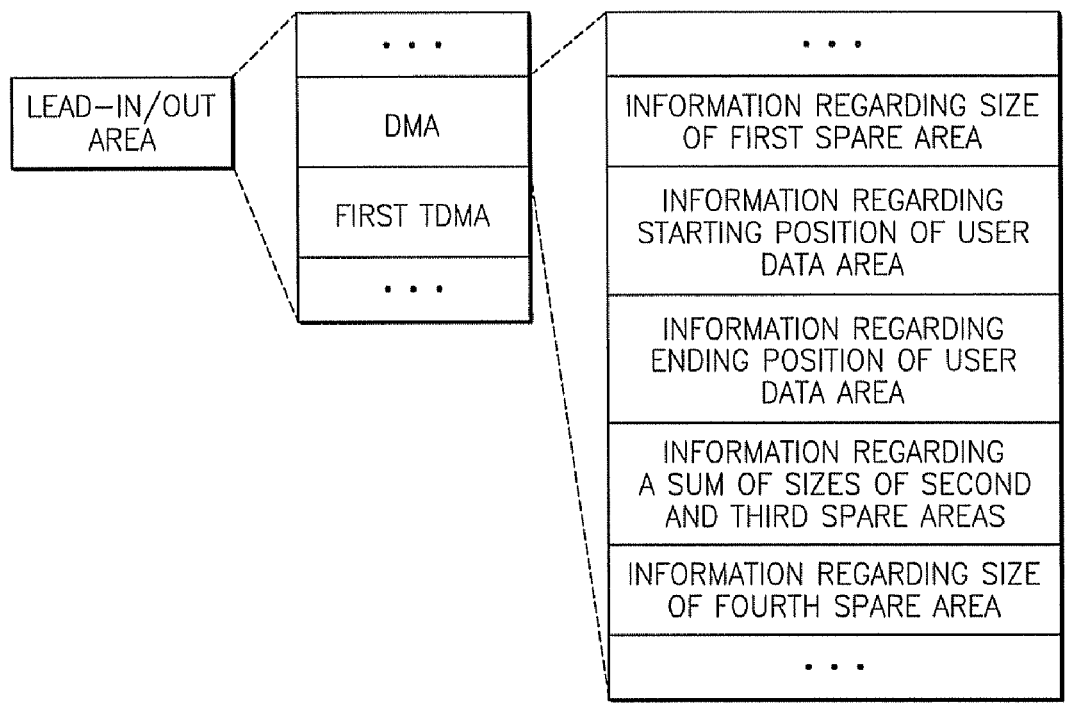
FIG. 6B illustrates a data structure of a lead-in/lead-out area of the disc of FIG. 6A, according to an embodiment of the present invention.

FIG. 6A illustrates a data structure of the disc 100, having two record layers L0 and L1, to which a temporary defect management area (TDMA) will be additionally allocated, according to an embodiment of the present invention. FIG. 6B illustrates a data structure of a lead-in/lead-out area of the disc 100 of FIG. 6A, according to an embodiment of the present invention.

Referring to FIG. 6A, a lead-in area, a data area, and an outer area are sequentially formed from the inner part of the first record layer L0 to its outer part. Also, an outer area, a data area, and a lead-out area are sequentially formed from the outer part of the second record layer L1 to its inner part. Unlike the single record layer disc of FIG. 3A, the lead-out area is present in the inner part of the disc 100 of FIG. 6A. That is, the disc 100 of FIG. 6A has an opposite track path (OTP) in which data is recorded starting from the lead-in area of the first record layer L0 toward its outer area and continuing from the outer area of the second record layer L1 to its lead-out area. Two spare areas are allotted to each of the record layers L0 and L1. That is, a first spare area and a second spare area are formed in the first record layer L0 and a third spare area and a fourth spare area are formed in the second record layer L1.

Referring to FIG. 6B, the lead-in area (and/or the lead-out area) includes a DMA and a first TDMA. The first TDMA is located within a range that does not change the positions of the lead-in area and the lead-out area defined with respect to a write once disc or rewritable disc. The reason why the write once disc according to the present invention requires the first TDMA is the same as described with reference to FIG. 3B. The DMA and/or the first TDMA may be formed in the outer area.

As in a rewritable disc on which disc defect management can be performed, information regarding a size of the first spare area, information regarding a starting position of a user data area, information regarding an ending position of the user data area, information regarding a sum of sizes of the second and third spare areas, and information regarding a size of the fourth spare area have been recorded in the DMA of the disc 100 with two record layers. Because a disc drive has already obtained information regarding starting and ending positions of the data area, the disc drive reads the information stored in the DMA to recognize the starting and ending positions of the user data area and the first through fourth spare areas. Here, the second and third spare areas have the same sizes.

Figure 7:
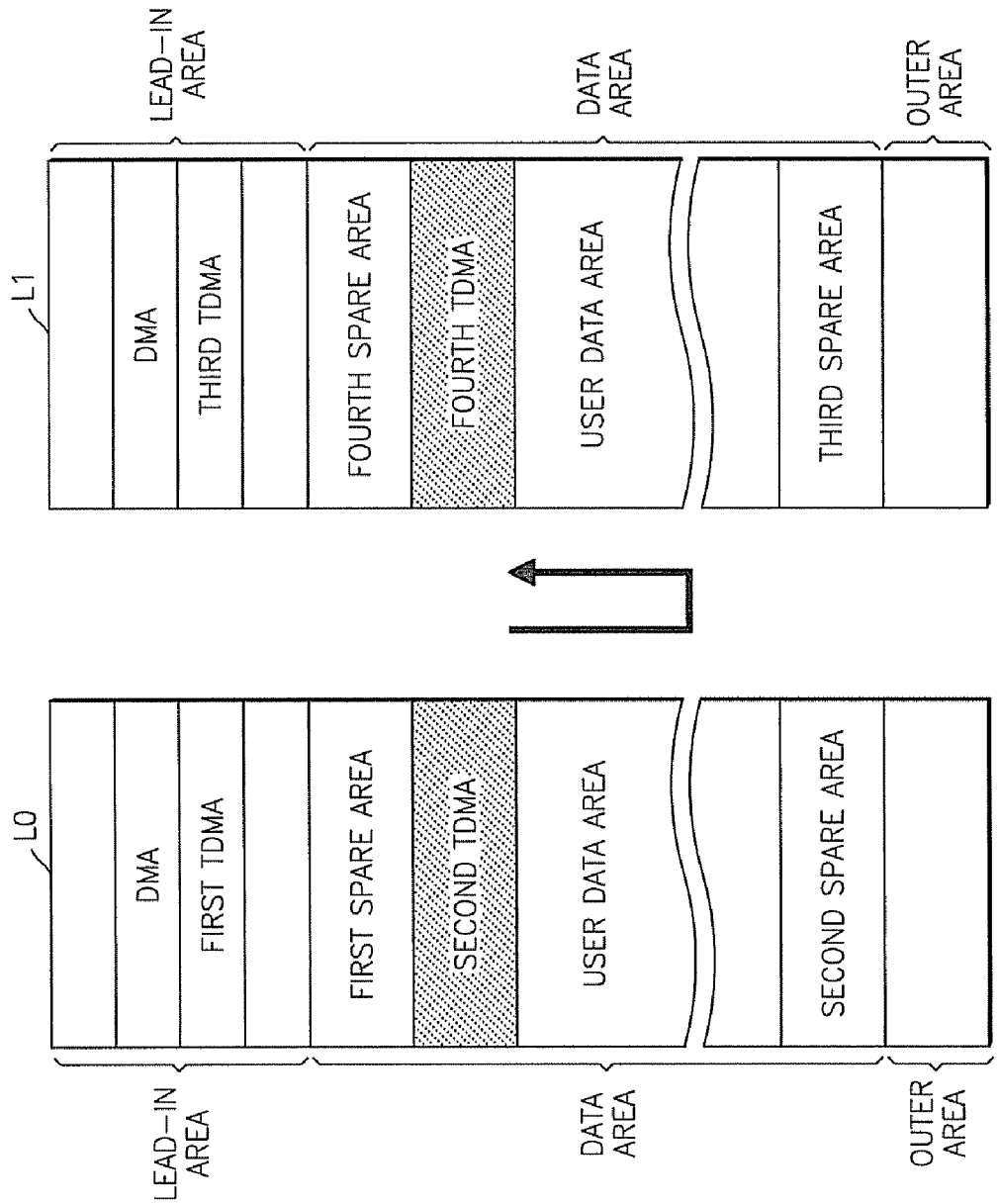
FIG. 7 illustrates a data structure of the disc of FIG. 6A further including an additional TDMA, according to an embodiment of the present invention.

FIG. 7 illustrates a data structure of the disc 100 of FIG. 6A further including a second TDMA, according to an embodiment of the present invention. Referring to FIG. 7, the second TDMA is formed between a first spare area and a user data area in the first record layer L0 of the disc 100 and formed between a user data area and a fourth spare area in the second record layer L1. Starting and ending positions of each record layer are as shown in FIG. 6A. Accordingly, a rewritable disc drive, for a rewritable disc with two record layers, is capable of accurately recognizing each area of the disc 100 that is a write once disc with two record layers. However, when the second TDMA is allocated to a portion of a data area, other than those shown in FIG. 7, the rewritable disc drive cannot recognize each area of the disc 100 (for details, see the description regarding FIGS. 4A and 4B).

Referring to FIG. 6A, the disc 100 includes a DMA in at least one of the lead-in area, the lead-out area, and the outer area, and includes a TDMA in at least one of the lead-in area and the lead-out area.

In general, information relating to managing disc defects in the disc 100 is recorded in the DMA. Such information includes the structure of the disc 100 for disc defect management, the recording position of defect information, whether defect management is performed or not, and the position and size of a spare area. Because the disc 100 is a write once disc, new data is recorded after previously recorded data when the above information changes.

In general, when a disc is loaded into a recording/reproducing apparatus, the apparatus reads data from a lead-in area and a lead-out area of the disc to determine how to manage the disc and record data on or read data from the disc. However, if the amount of data recorded in the lead-in area and/or the lead-out area increases, a longer time is spent on preparing the recording or reproducing of data after the loading of the disc. To solve this and/or other problems, the present invention uses temporary defect management information and temporary defect information that are to be recorded in a TDMA allotted to the lead-in area and/or the lead-out area.

Hereinafter, disc defect management according to an embodiment of the present invention will be described with respect to the disc 100, i.e., a write once disc, such as that shown in FIG. 4A, 4B, or 7, the disc 100 including a second TDMA. The present applicants have filed other Korean patent applications regarding disc defect management, e.g., Korean patent application No. 2002-61897 filed on Oct. 10, 2002. Details for disc defect management are well described in these applications.

In this embodiment, disc defect management is performed using the linear replacement method. Temporary defect information is recorded as a result of disc defect management in a first TDMA through a fourth TDMA and includes temporary defect information and temporary defect management information. The temporary defect information specifies a location of a portion, i.e., a defective portion, of the disc 100 in which a defect occurs and a location of a replacement for data stored in the defective portion. The temporary defect management information is used to manage the temporary defect information and specifies a recording position of the temporary defect information.

In this embodiment, the temporary defect information and temporary defect management information recorded in the second TDMA or the fourth TDMA are recorded periodically, i.e., they are recorded whenever data is recorded in a user data area in a number of cluster units or the verify-after-write method is performed at least once. The temporary defect information and temporary defect management information recorded in the first TDMA or the third TDMA are recorded whenever a recording operation ends. When temporary defect information and temporary defect management information are newly recorded in the first or second TDMA, the first or second TDMA is considered as being updated.

Lastly recorded temporary defect information and temporary defect management information, i.e., most recently updated and recorded temporary defect information and temporary defect management information, are recorded in the DMA for disc finalization for the following reason. In the case that additional data will not be recorded on the disc 100, i.e., the disc 100 needs to be finalized, the temporary defect management information and temporary defect information, which have been updated several times, are again recorded in the DMA. Accordingly, the recording/reproducing apparatus can fast read defect management information from the disc 100 just by reading temporary defect management information and temporary defect information that have been recorded last in the DMA. Further, recording of the temporary defect information and temporary defect management information in the DMA increases the reliability of information.

Figure 8A:
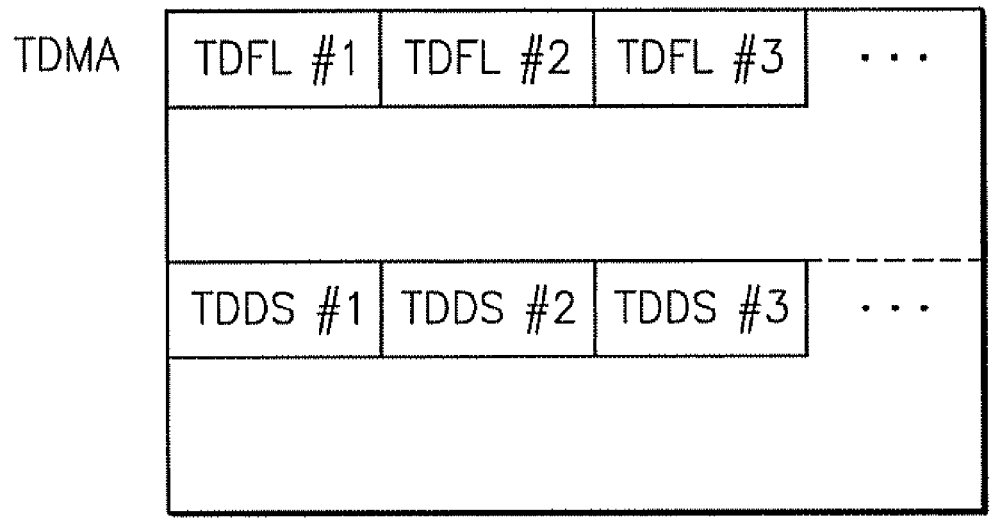
FIGS. 8A through 8D illustrate data structures of a TDMA according to embodiments of the present invention.

FIGS. 8A through 8D illustrate data structures of a TDMA according to embodiments of the present invention. The TDMA of FIG. 8A is logically divided into a temporary defect information area and a temporary defect management information area. In the temporary defect information area, temporary defect information TDFL #1, TDFL #2, TDFL #3, . . . are sequentially recorded starting from the start of this area toward its end. In the temporary defect management information area, temporary defect management information TDDS #1, TDDS #2, TDDS #3, . . . are sequentially recorded starting from the start of this area. The temporary defect management information TDDS #1, TDDS #2, and TDDS #3 corresponds to the temporary defect information TDFL #1, TDFL #2, and TDFL #3, respectively.

Figure 8B:
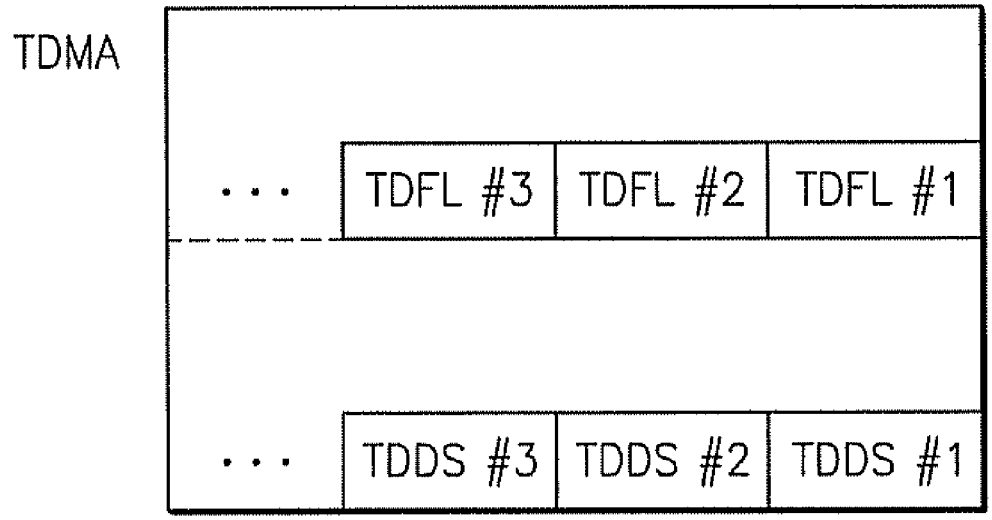

Referring to FIG. 8B, compared to FIG. 8A, a DMA is also logically divided into a temporary defect information area and a temporary defect management information area, but the sequences of recording information are not the same. More specifically, in the temporary defect information area, temporary defect information TDFL #1, TDFL #2, TDFL #3, . . . are sequentially recorded starting from the end of this area toward its start. In the temporary defect management information area, temporary defect management information TDDS #1, TDDS #2, TDDS #3, . . . are sequentially recorded starting from the end of this area. The temporary defect management information TDDS #1, TDDS #2, and TDDS #3 corresponds to the temporary defect information TDFL #1, TDFL #2, and TDFL #3, respectively.

Figure 8C:
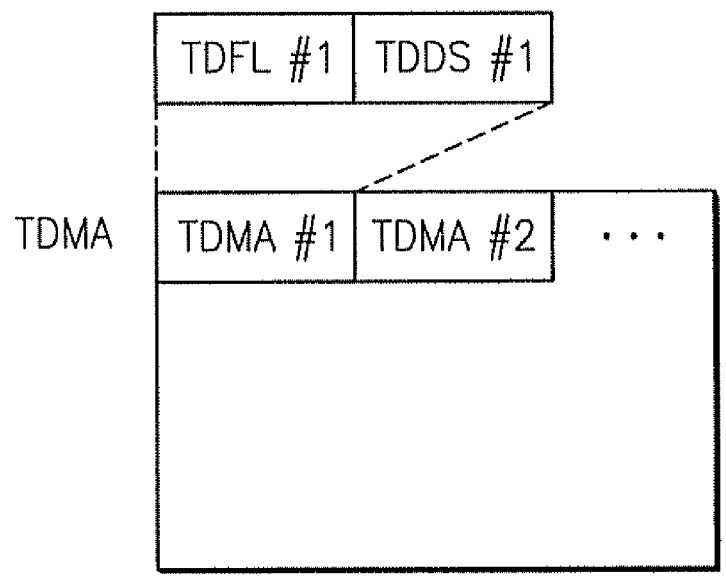

Referring to FIG. 8C, corresponding temporary defect information and temporary defect management information are recorded as pairs of information in a TDMA. More specifically, temporary management information TDMA #1, TDMA #2, are sequentially recorded starting from the start of the TDMA. The temporary management information TDMA #1 contains a pair of corresponding temporary defect information TDFL #1 and temporary defect management information TDDS #1, and temporary management information TDMA #2 contains a pair of corresponding temporary defect information TDFL #2 and temporary defect management information TDDS #2.

Figure 8D:
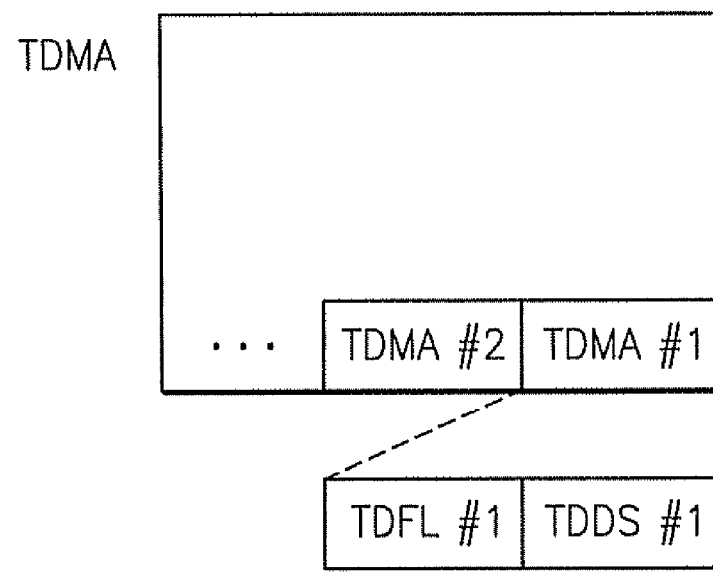

Referring to FIG. 8D, compared to the TDMA of FIG. 8C, corresponding temporary defect information and temporary defect management information are recorded as pairs of information in a TDMA, but the sequence of recording the information is not the same. More specifically, in the TDMA, temporary management information TDMA #1, TDMA #2, . . . are sequentially recorded starting from the end of the TDMA. The temporary management information TDMA #1 contains a pair of corresponding temporary defect management information TDDS #1 and temporary defect information TDFL #1, and the temporary management information TDMA #2 contains a pair of corresponding temporary defect management information TDDS #2 and temporary defect information TDFL #2.

Figure 9:
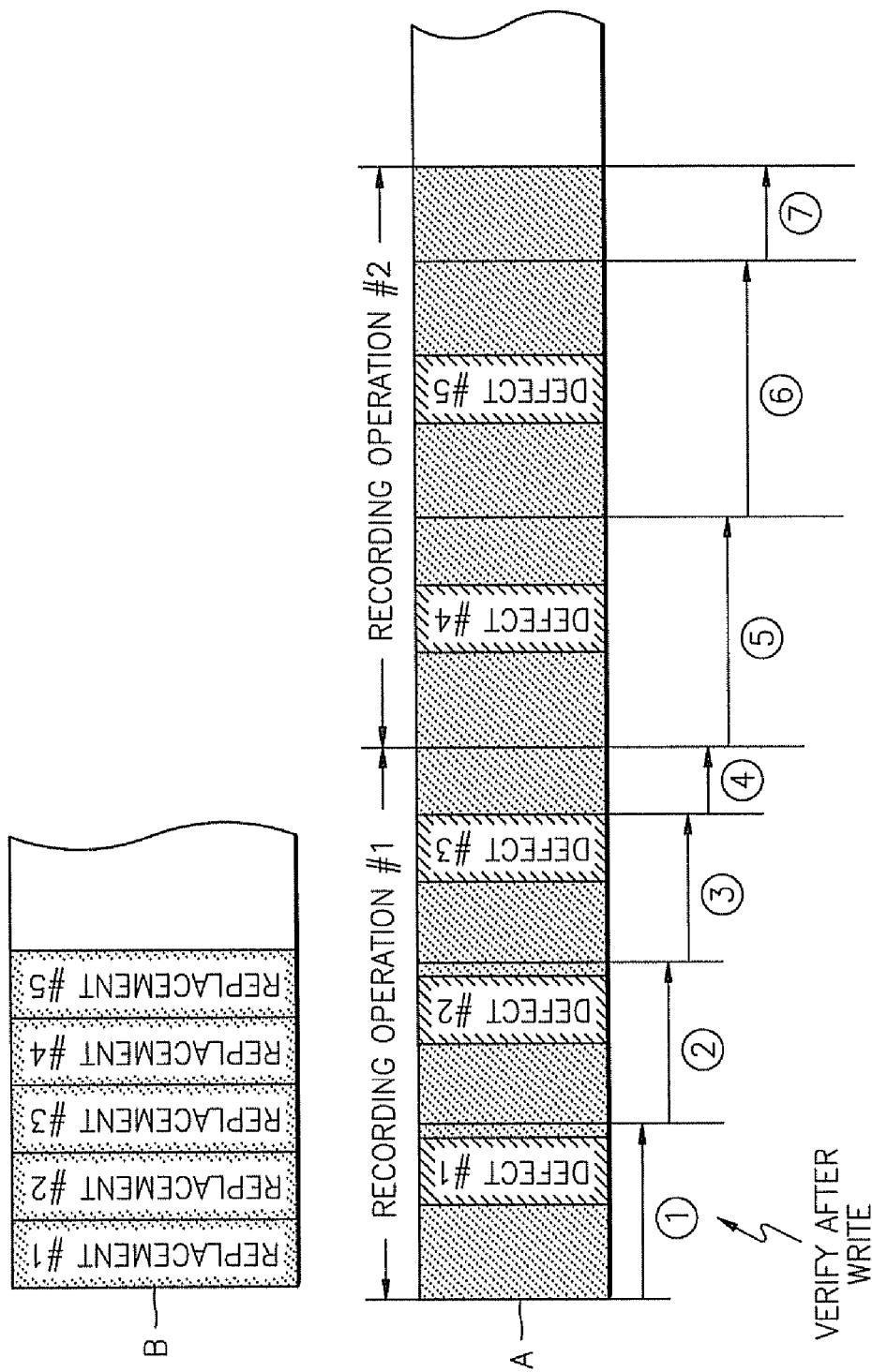
FIG. 9 illustrates diagrams explaining recording of data in a user data area A and a spare area B, according to an embodiment of the present invention.

FIG. 9 is a reference diagram illustrating in detail recording of data in a user data area A and a spare area B, according to an embodiment of the present invention. Referring to FIG. 9, A denotes a user data area and B denotes a spare area in which Physical Sector Numbers (PSNs) are sequentially allocated to a plurality of sectors (not shown). In general, each Logical Sector Number (LSN) corresponds to at least one PSN. However, because LSNs are allocated to non-defective areas, including replacements recorded in the spare area, the correspondence between the PSNs and the LSNs is not maintained when a disc has a defective area, even if the size of a physical sector is the same as that of a logical sector.

In the data area A, sections ① through ⑦ denote predetermined units of data in which the verify-after-write method is performed. A disc drive records user data in section ①, returns to the start of section ①, and checks if the user data is appropriately recorded or a defect exists in section ①. If a defect is detected in a portion of section ①, the portion is designated as defect #1. The user data recorded in defect #1 is also recorded on a portion of the spare area B. Here, the portion of the spare area B is referred to as replacement #1.

If a second TDMA is updated whenever the verify-after-write method is completed, the disc drive records information regarding defect #1 and information regarding replacement #1 as temporary defect information TDFL #1 in the second TDMA. Also, management information to manage the temporary defect information TDFL #1 is recorded as temporary defect management information TDDS #1 in the second TDMA.

Next, the disc drive records user data in section ②, returns to the start of section ②, and checks whether the user data is properly recorded or a defect exists in section ②. If a defect is detected in a portion of section ②, the portion is designated as defect #2. Likewise, replacement #2 corresponding to defect #2 is formed in the spare area B. Information regarding defect #2 and information regarding replacement #2 are recorded as temporary defect information TDFL #2 in the second TDMA. Also, management information to manage the temporary defect information TDFL #2 is recorded as temporary defect management information TDDS #2 in the second TDMA.

Further, defect #3 and replacement #3 are designated in section ③ of the user data area A and the spare area B, respectively. Similarly, the second TDMA is updated. In section ④, a defect does not occur and a defective area is not designated. The disc drive records information regarding defect #1, #2, and #3 occurring in sections ① through ④ as temporary defect information TDFL #1 in a first TDMA, when recording operation #1 is expected to end, after the recording and verifying of data to section ④, i.e., when a user presses the eject button of the recording and/or reproducing apparatus or recording of user data allocated in a recording operation is completed. Also, management information to manage the temporary defect information TDFL #1 is recorded as temporary defect management information TDDS #1 in the first TDMA.

When recording operation #2 starts, data is recorded in sections ⑤ through ⑦ and defects #4 and #5 and replacements #4 and #5 are formed in the user data area A and the spare area B, respectively, as explained in sections ① through ④. Likewise, the second TDMA is updated whenever the verify-after-write method is completed. When recording operation #2 is expected to end, the disc drive records information regarding defects #4 and #5 as temporary defect information TDFL #2 in the first TDMA and further records information stored in the second TDMA in the first TDMA. Also, management information to manage the temporary defect information TDFL #2 is recorded as temporary defect management information TDDS #2 in the first TDMA.

Figure 10:
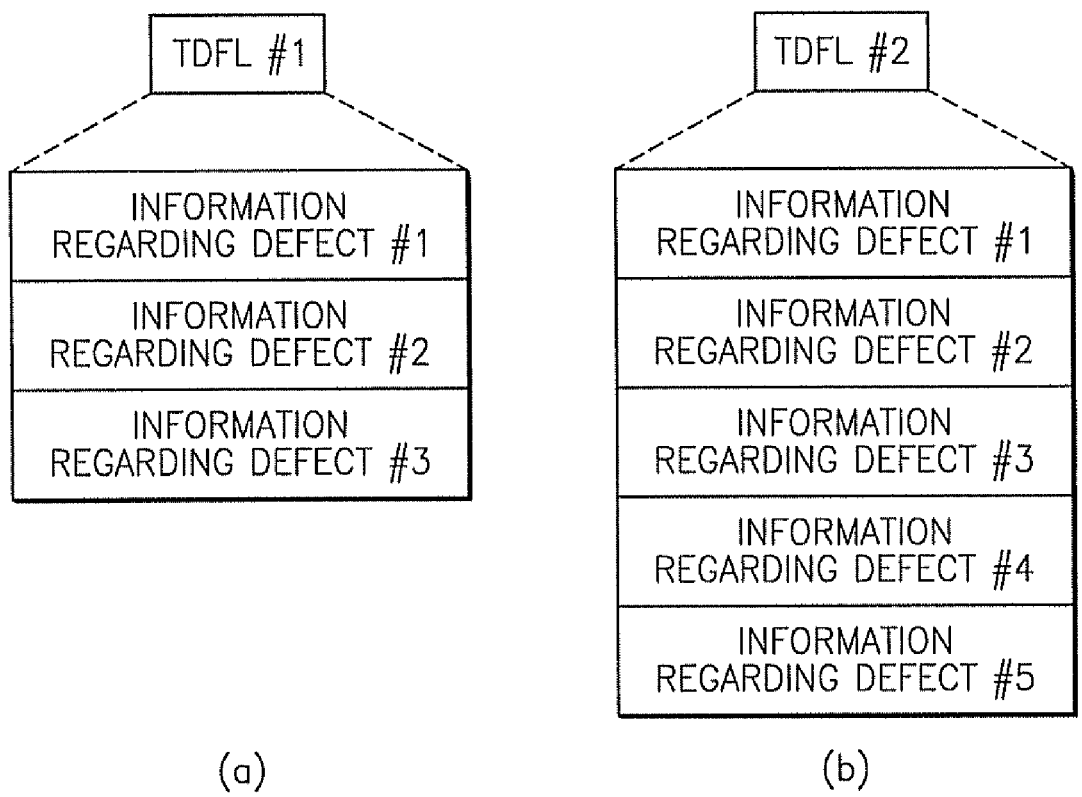
FIG. 10 illustrates data structures of temporary defect information TDFL #1 and TDFL #2 according to embodiments of the present invention.
Figure 11:
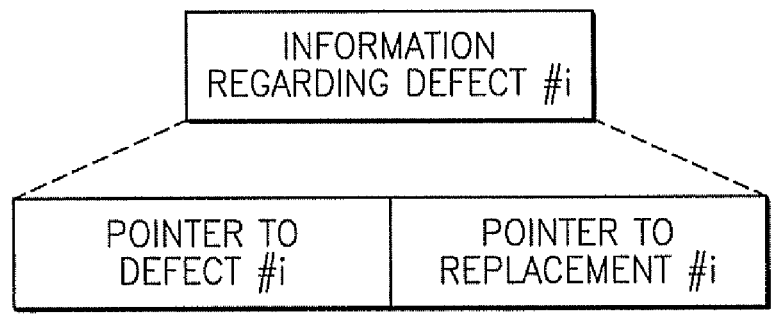
FIG. 11 illustrates a data structure of information regarding defect #i.

FIG. 10 illustrates data structures of temporary defect information TDFL #1 and TDFL #2 according to an embodiment of the present invention. FIG. 11 illustrates a data structure of information regarding defect #i.

Referring to FIG. 10, temporary defect information TDFL #1 recorded in a first TDMA contains information regarding defects #1, #2, and #3. The information regarding defect #1 indicates the position of an area in which defect #1 exists and the position of an area in which replacement #1 is recorded. The information regarding defect #2 indicates the position of an area in which defect #2 exists and the position of an area in which replacement #2 is recorded. The information regarding defect #3 indicates the position of an area in which defect #3 exists and the position of an area in which replacement #3 is recorded.

Temporary defect information TDFL #2 recorded in the first TDMA further contains information regarding defects #4 and #5 in addition to the information recorded in temporary defect information TDFL #1. More specifically, temporary defect information TDFL #2 includes the information regarding defect #1, the information regarding defect #2, the information regarding defect #3, the information regarding defect #4, and the information regarding defect #5.

Similarly, temporary defect information TDFL #1 recorded in the second TDMA includes information regarding defect #1. Temporary defect information TDFL #2 recorded in the second TDMA includes information regarding defect #1 and information regarding defect #2. Temporary defect information TDFL #3 recorded in the second TDMA includes information regarding defect #1, information regarding defect #2, and information regarding defect #3.

Referring to FIG. 11, information regarding defect #i includes a pointer to defect #i, and a pointer to replacement #i. The pointer to defect #i specifies starting and ending positions of defect #i. The pointer to replacement #i specifies starting and ending positions of replacement #i.

A disc defect management method according to an embodiment of the present invention will now be described with reference to the accompanying drawings.

Figure 12:
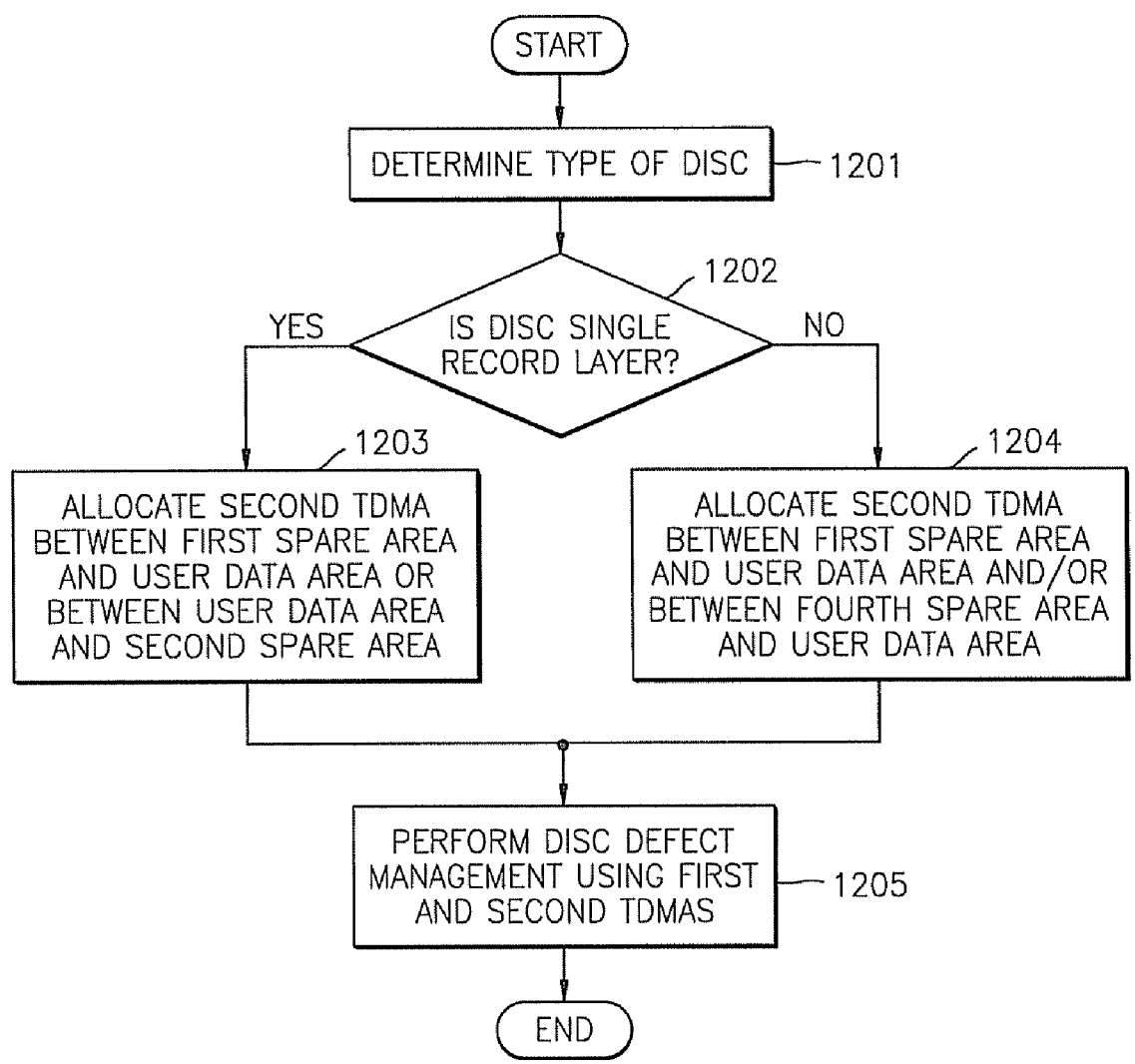
FIG. 12 is a flowchart illustrating a disc defect management method according to an embodiment of the present invention.

FIG. 12 is a flowchart illustrating a disc defect management method according to an embodiment of the present invention. Referring to FIG. 12, when the disc 100 is loaded into the disc drive of FIG. 2, the apparatus reads disc information from a lead-in area and/or a lead-out area of the disc 100 to determine the type of the disc 100 (action 1201). Next, the disc is checked to determine whether the disc 100 is a single record layer disc or not (action 1202). If the disc 100 is determined in action 1202 to be a single record layer disc, a second TDMA is allocated between a first spare area and a user data area or between the user data area and a second spare area, as shown in FIG. 4A or 4B (action 1203). If the disc 100 is determined in action 1202 to be a double record layer disc, the second TDMA is allocated between the first spare area and the user data area and/or between a fourth spare area and the user data area, as shown in FIG. 7 (action 1204). Next, the disc drive performs the disc defect management method as described above, using a first TDMA and the second TDMA (action 1205).

FIG. 13 is a flowchart illustrating a disc defect management method according to an embodiment of the present invention. Referring to FIG. 13, the disc drive of FIG. 2 records user data in a data area of the disc 100 in units of data to facilitate the verify-after-write method (action 1301). Next, the user data recorded in action 1301 is verified to detect an area of the disc having a defect (action 1302). Next, the disc drive designates the area having the defect as a defective area, rewrites data recorded in the defective area to a spare area so as to create a replacement area, and creates pointer information pointing to locations of the defective area and the replacement area (action 1303). The pointer information is temporarily stored as temporary defect information (action 1304) in a first TDMA. Next, a determination is made whether the verify-after-write method is performed a predetermined number of times (action 1305). If the verify-after-write method is performed the predetermined number of times, the disc drive updates a second TDMA using the temporarily stored temporary defect information (action 1306). Next, a determination is made whether a recording operation is expected to end (action 1307). If the recording operation is expected to end, the disc drive updates the first TDMA and/or the second TDMA using the temporarily stored temporary defect information (action 1308). Here, the first TDMA is continuously updated but the second TDMA is updated conditionally. For instance, the second TDMA may be updated whenever the verify-after-write method is completed. Next, a determination is made whether disc finalization is required or not (action 1309). If disc finalization is required, the information most recently updated in the first and second TDMAs is recorded in a DMA (action 1310).

As described above, according to the present invention, a first TDMA and a second TDMA are allocated to a write once disc so that the write once disc is compatible with a rewritable disc drive, and disc defect management can be performed on the write once disc using the rewritable disc drive. For disc finalization, information most recently updated in the first and second TDMAs is recorded in a DMA, thereby enabling information stored in the write once disc to be reproduced by the rewritable disc drive.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing defects in a recording medium, comprising:
    allocating a first temporary defect management area (TDMA) to a lead-in area on the recording medium;
    allocating a second TDMA between the lead-in area and a user data area on the recording medium;
    reproducing most recently updated temporary defect information (TDFL) and temporary defect management information (TDDS) which are recorded on the first TDMA or the second TDMA,
    reproducing user data recorded on the user data area using the TDFL,
    wherein the TDFL includes information on a position of a defective area which occurs within the user data area, and the TDDS includes information on a recording position of the TDFL.

2. The method of claim 1, wherein the recording medium is a write once optical disc.

3. The method of claim 1, wherein the recording medium comprises a data area comprising a first spare area storing defect replacement information, the user data area storing the user data, and a second spare area storing defect replacement information.

4. The method of claim 3, wherein the second TDMA is recorded in at least one of a section within the data area between the first spare area and the user data area and a section within the data area between the user data area and the second spare area.

5. The method of claim 2, wherein the write once optical disc is a dual recording layer optical disc comprising a first recording layer and a second recording layer.

6. A method of reproducing user data in a recording medium, comprising:
  reproducing most recently updated temporary defect information (TDFL) and temporary defect management information (TDDS) which are recorded on a first temporary defect management area (TDMA) or a second TDMA of the recording medium; and
  reproducing user data recorded on a user data area within a data area of the recording medium using the TDFL,
  wherein the TDFL includes information on a position of a defective area which occurs within the user data area, the TDDS includes information on a recording position of the TDFL, the first TDMA is provided in a lead-in area on the recording medium, and the second TDMA is provided between the lead-in area and the user data area on the recording medium.

7. A write once disc including a lead-in area and a data area, comprising:
  a first temporary defect management area (TDMA) allocated in the lead-in area; and
  a second TDMA allocated between the lead-in area and a user data area within the data area on the recording medium;
  wherein the first TDMA or the second TDMA includes temporary defect information (TDFL) and temporary defect management information (TDDS), and
  the TDFL includes information on a position of a defective area which occurs within the user data area, and the TDDS includes information on a recording position of the TDFL.

* * * * *